United States Patent
Gaudin et al.

(10) Patent No.: US 6,374,105 B1
(45) Date of Patent: *Apr. 16, 2002

(54) METHOD OF ALLOCATING LINKS BETWEEN A SET OF AREAS AND A SET OF SATELLITES

(75) Inventors: Etienne Gaudin; Fabrice Noreils, both of Orsay (FR)

(73) Assignee: Alcatel, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/362,098

(22) Filed: Jul. 28, 1999

(30) Foreign Application Priority Data

Aug. 6, 1998 (FR) .............................................. 98 10134

(51) Int. Cl.$^7$ ................................................ H04A 7/20
(52) U.S. Cl. ........................ 455/429; 455/450; 455/12.1
(58) Field of Search .............................. 455/12.1, 13.1, 455/62, 63, 67.1, 67.3, 427, 429, 446, 450, 452; 342/352, 354; 370/316, 317

(56) References Cited

U.S. PATENT DOCUMENTS

| | | | | |
|---|---|---|---|---|
| 5,179,722 A | * | 1/1993 | Gummar et al. ............ | 455/446 |
| 5,268,694 A | * | 12/1993 | Jan et al. ..................... | 342/254 |
| 5,365,571 A | * | 11/1994 | Rha et al. .................... | 455/446 |
| 5,465,390 A | * | 11/1995 | Cohen .......................... | 455/446 |
| 5,590,395 A | * | 12/1996 | Diekelman .................. | 455/13.1 |
| 5,749,044 A | | 5/1998 | Natarajan et al. | |
| 6,081,710 A | * | 6/2000 | Sherman et al. ............ | 455/427 |
| 6,259,913 B1 | * | 7/2001 | Noreils et al. .............. | 455/429 |

FOREIGN PATENT DOCUMENTS

WO    WO 96/14696    5/1996

* cited by examiner

Primary Examiner—Nay Maung
Assistant Examiner—Quochien B. Vuong
(74) Attorney, Agent, or Firm—Sughrue Mion, PLLC

(57) ABSTRACT

In a method of allocating links between a set of areas each equipped with at least one gateway and a set of satellites at successive times, the following steps are iterated each time: a) detecting among all links allocated the previous time, using a constraints propagation algorithm, links which must be interrupted, retaining the other links in the new allocation plan, and b) using an optimization algorithm to allocate the remaining links, conforming to conditions imposed by interference problems. Applications include satellite communications.

6 Claims, 3 Drawing Sheets

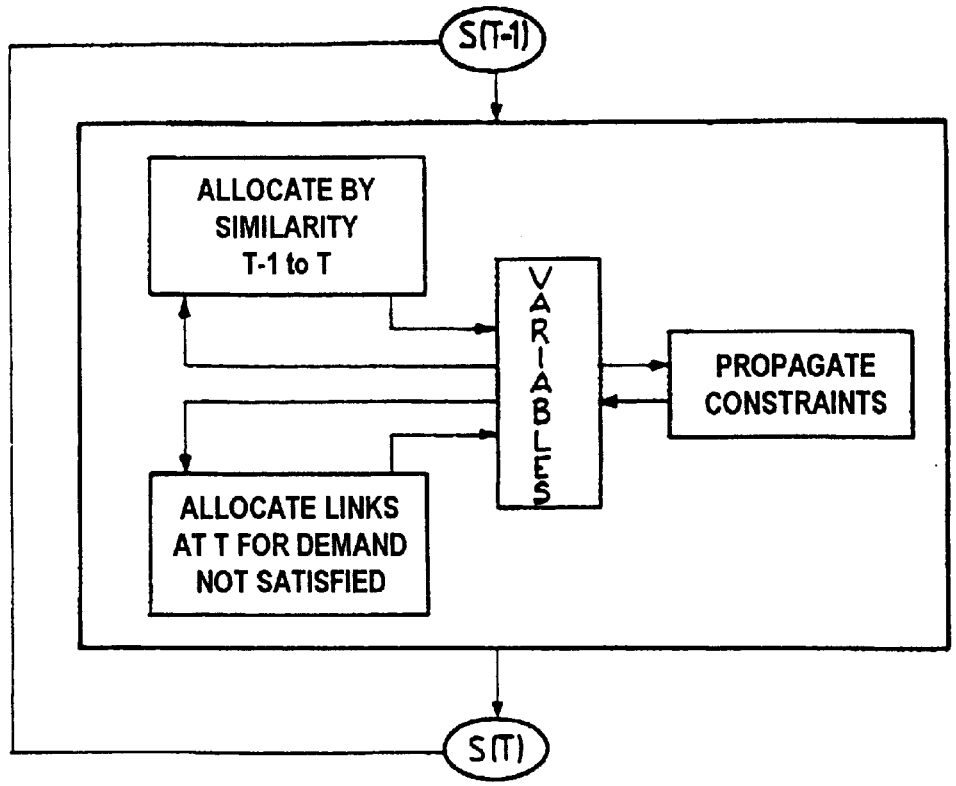
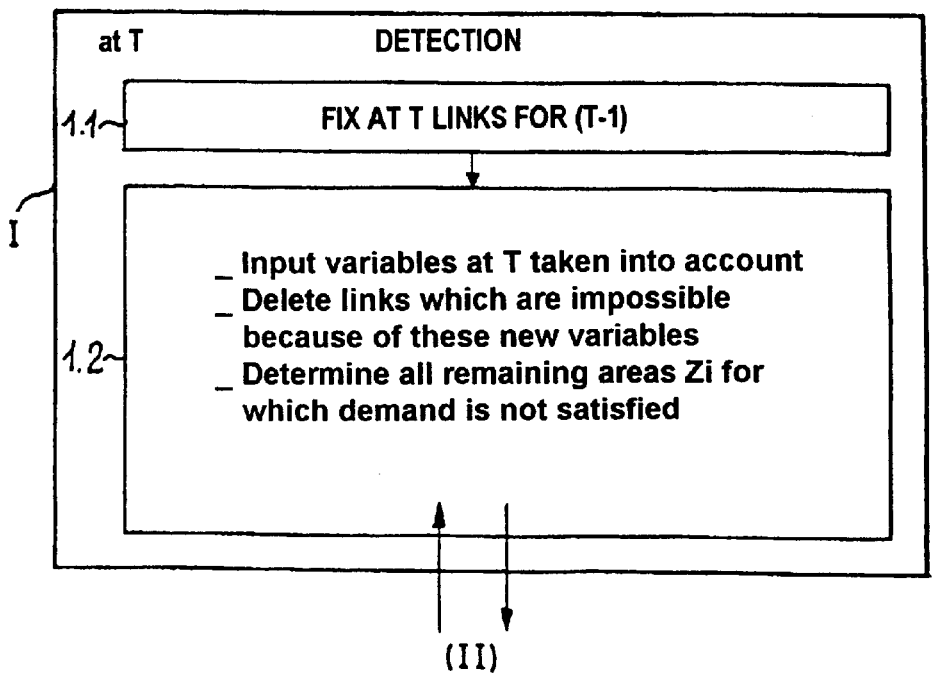

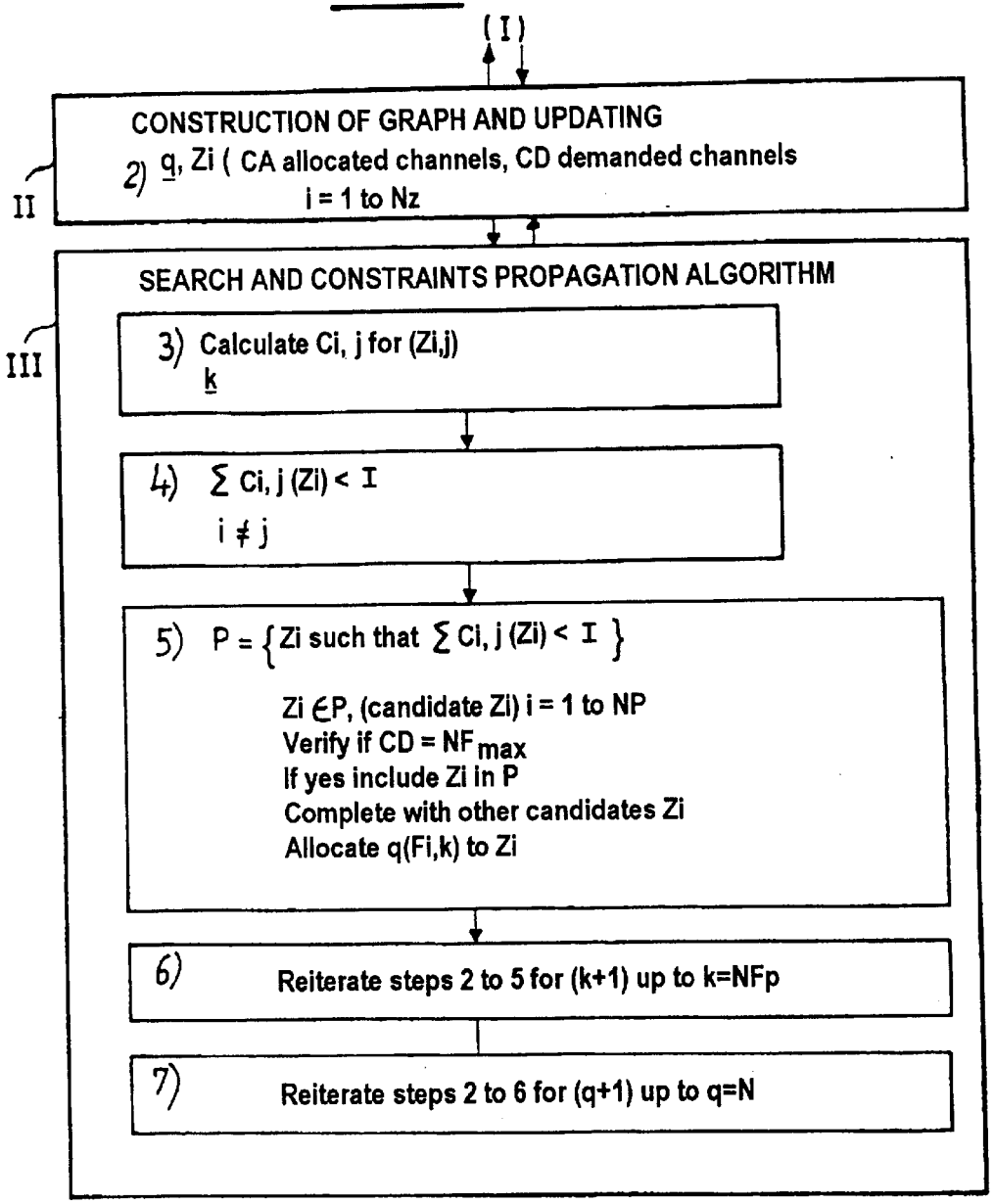

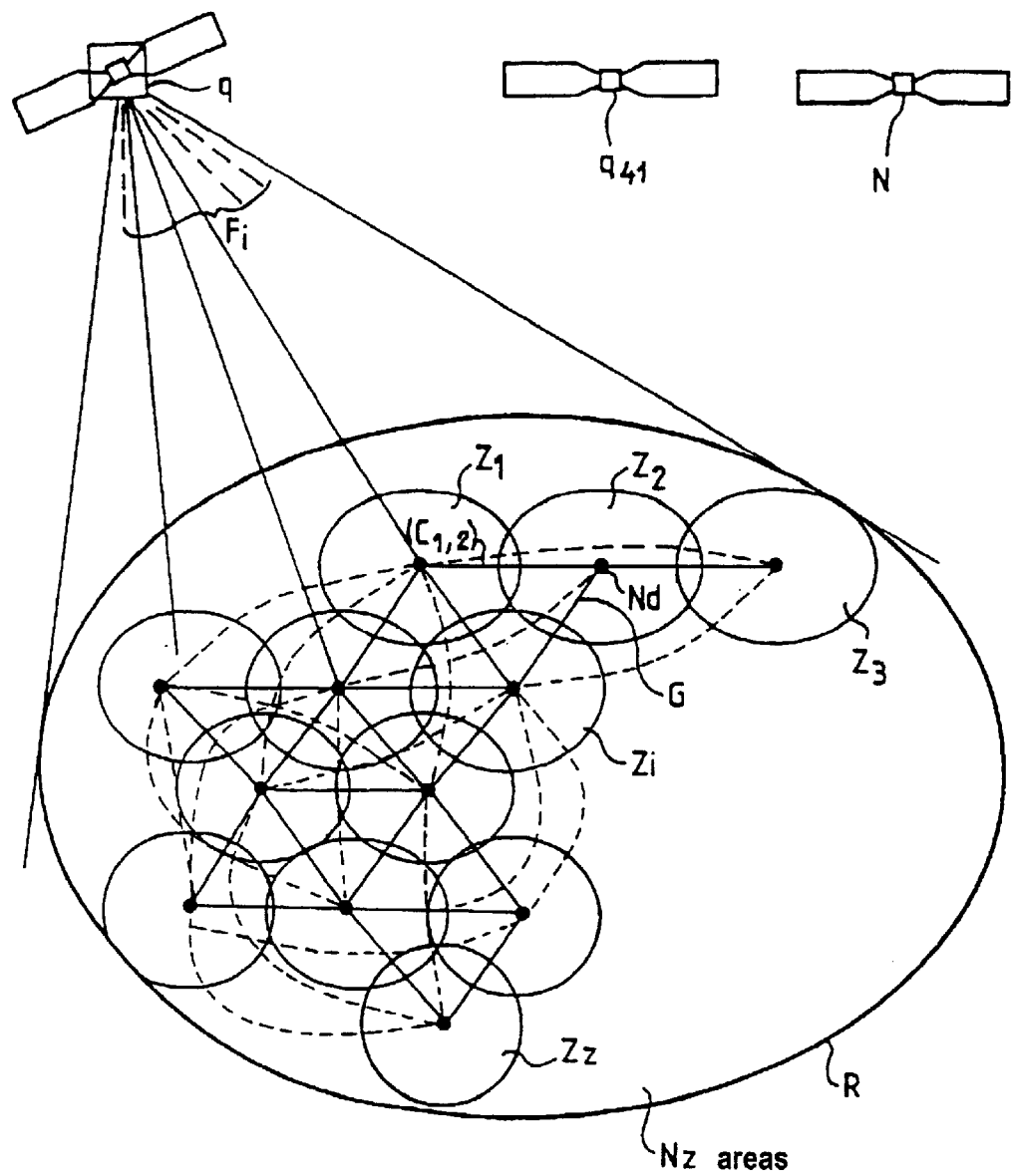
FIG_4

METHOD OF ALLOCATING LINKS BETWEEN A SET OF AREAS AND A SET OF SATELLITES

BACKGROUND OF THE INVENTION

1. Field of the Invention

The invention applies to satellite communications and more particularly to a broadband access system using a constellation of satellites in low Earth orbit to provide broadband services, essentially multimedia services.

The invention applies to access systems using geostationary satellites (GEO) and also to access systems using satellites in low Earth orbit (LEO).

2. Description of the Prior Art

The invention applies very particularly to a new broadband access system that is currently under development. This system is called SkyBridge. It makes available to users worldwide services such as fast access to the Internet and videoconferencing. It will use a constellation of 80 LEO satellites which link business and domestic users equipped with low-cost terminals to terrestrial gateways.

The SkyBridge system has two segments:

A space segment: the space segment comprises 80 LEO satellites (plus spare satellites) in orbit at an altitude of 1,457 km and the ground control segment comprising the satellite control center and tracking telemetry and control stations. The space segment provides permanent coverage in the band of latitudes from +68° to −68°. It connects each SkyBridge user to the nearest gateway.

A terrestrial segment: the terrestrial segment comprises the terrestrial gateways and the user terminals. The former provide interconnection via an ATM switch with local servers and with broadband and narrowband terrestrial networks.

The SkyBridge access system is based on the asynchronous transfer mode (ATM) used to connect users to a local switch. Traffic emanating from terminals is transmitted in a transparent manner by the satellite (i.e. without any processing other than amplification and frequency conversion) to the gateway and vice versa. The gateways have switching functions and serve as interfaces with terrestrial networks.

The Earth is divided geographically into areas with a radius of about 350 km which comprise up to 2,000,000 potential clients and a gateway between those clients and the satellites of the constellation which illuminate the area. The station enables clients of the service in that area to communicate with the constellation.

The satellites of a low Earth orbit constellation generally move across the sky and can illuminate a geographical area z defined in the above manner for at least a few minutes and at most around twenty minutes.

The access system must nevertheless provide a certain bit rate between the constellation and the fixed points that the gateways form in this environment.

To this end, it is necessary to optimize the resources available on board each satellite. A way must be found to allocate the resources to points on the ground so that the services offered can be provided and meet the demand from clients.

The resources for a satellite are the number of antennas or individual beams multiplied by the number of channels (frequency resource) available to each satellite in the frequency band reserved to the access system.

One way of increasing the number of frequency bands that can be used in the band reserved for the system is to transmit with one or other polarization (which in practice doubles the number of frequency bands in the band reserved to the system). However, this still means that the same channel must not be used for neighboring areas.

However, it is then necessary to solve the problem of interference between waves when using the same frequency band for adjoining areas and to prevent any interference. Using the same frequency band for neighboring areas (i.e. adjacent or closely spaced areas) causes interference which reduces the signal to noise ratio of the received wave.

In the new SkyBridge system, the antennas can be steered. They will be mobile antennas whose orientation is controlled mechanically.

Each satellite illuminates a region with a radius of 3,000 km. A satellite can produce up to 45 individual beams simultaneously.

As the satellites move, the gateways on the ground must switch traffic to a new satellite in a manner that is transparent for users.

Once a satellite-ground station link has been set up, it is maintained throughout the time for which the area in which the ground station is located is visible from the satellite.

Ground allocation plans established for a given period must take into account all dynamic aspects of the new system and provide a good grade of service. To provide this grade of service to the network operator it is preferable to maintain the same link for as long as possible. This is because each change of link, although transparent for the users, necessitates synchronization signals between the connection satellite and the user. These communications are synchronization signals and not payload information (user communication), and result in a reduction of bandwidth for the network operator.

The present invention solves this problem of the continuity of the links.

The present invention makes it possible to provide a good grade of service to the network operator and to the end user by increasing the duration of a link while satisfying all demands, despite all the dynamic aspects of the system associated with the fact that the antennas can be steered.

SUMMARY OF THE INVENTION

The present invention therefore consists in a method of allocating links between a set of areas each equipped with at least one gateway and a set of satellites at successive times, the following steps being iterated each time:

detecting links which must be interrupted among all links allocated the previous time using a constraints propagation algorithm, and retaining the other links in a new allocation plan, and using an optimization algorithm to allocate the remaining links, conforming to conditions imposed by interference problems.

In accordance with another feature of the invention, the constraints propagation algorithm used for detection comprises the following steps:

fixing at time T the allocated links of the previous allocation plan established at time T−1, eliminating the impossible links, defined by the known input variables for the new plan at time T, determining all remaining areas for which the demand is not satisfied.

In accordance with another feature of the invention, the optimization algorithm for allocating links between all the remaining areas and all the satellites illuminating those areas, the links being determined by a channel, includes the following steps, which are iterated for each channel and for each satellite:

constructing an interference graph, use of the graph by a search algorithm associated with a constraints propagation algorithm to verify the capacities.

The construction of the graph at time during which a satellite covers a number of areas and has a number of beams and a number of channels includes the following steps:

constructing the graph for that satellite in which each node of the graph corresponds to an area such that the number of channels demanded for that area is greater than the number of channels allocated, updating the graph by removing or adding an area as and when links are allocated.

In accordance with another feature of the invention, the search algorithm utilizes the following steps:

calculating an interference coefficient for each pair of areas of the graph for a channel, comparing the sum of the interference coefficients for each area to a predetermined maximum acceptable interference threshold, creating a partition of at most the same number of elements as the number of beams which includes areas such that for each area the sum of the interference coefficients does not exceed the predetermined threshold.

The iteration for each channel and for each satellite consists in reiterating all the steps of the method for another channel up to the last channel and then reiterating all of the preceding steps for another satellite up to the last satellite.

Other features and advantages of the invention will become apparent on reading the following description, which is given by way of non-limiting example and with reference to the drawings.

BRIEF DESCRIPTION OF THE DRAWINGS

FIG. 1 shows the method of the invention in the form of a flowchart.

FIG. 2 shows the detection steps.

FIG. 3 shows the steps of the optimization algorithm.

FIG. 4 is a diagram showing the imprint of a satellite on the ground and the corresponding interference graph.

DETAILED DESCRIPTION OF THE PREFERRED EMBODIMENT

The invention considers at time T the links set up at time T−1 and the aim is to maintain them. The allocation plan S(T−1) at time T−1 is used again at time T, in an iterative manner, as shown by the loop S(T−1)→S(T) in FIG. 1.

However, variables of the domain concerned have changed between time T−1 and time T. In particular, some satellites are no longer visible from a given area.

Furthermore, the demand to be satisfied for a given area is not necessarily the same from time T−1 to time T. These changes therefore make some things impossible in the allocation plan to be defined at time T compared to the plan defined at time T−1.

Each link set up at time T−1 is therefore considered and they are fixed at time T.

Some links will not be fixed definitively because of the changes just referred to and consequently demand is not satisfied in a number of areas.

It is therefore necessary to detect if a link can be fixed or not:

There are various situations:

The satellite is no longer visible from some areas. This information is input data known at initialization time. Use of the links between these areas and this satellite cannot continue.

For some areas it is essential to allocate a particular link. This is the case for an area that is illuminated by only one satellite, for example. Its demand must then be met entirely by that satellite and the number of channels corresponding to that demand must then be reserved to that area on the beams of that satellite.

To satisfy areas that are not satisfied an optimization algorithm described below is used with initial conditions for the algorithm that take account of the fact that some areas have already been satisfied; the links can then be used again at time T (i.e. they can be maintained).

The optimization algorithm constructs a graph (step II) and executes a search algorithm using the graph (step III).

Each satellite and each resource are used to construct a partition P for all areas Zi for which demand is not satisfied.

Many beams have already been oriented because some links are used again. In the partitions to be created it will already be known which area is already allocated to a given satellite. There are fewer possible combinations than on starting from the initial conditions in which all the area, satellite, resource variables are at zero. The search algorithm starts with initial conditions set by the situation applying at time T−1.

To detect which links are used again and which links are not used again, all the links used previously, i.e. at time T−1, are fixed. The interference coefficients are calculated for each area Zi. The sum of the coefficients Ci,j is calculated for a given area Zi; it is found that the interference threshold I is now reached or exceeded for some areas. In this case, the corresponding links cannot be retained because if these links were kept too much interference would be generated in the areas concerned. Therefore these areas cannot be satisfied.

It is then necessary to fix other links for the areas Zi that are not satisfied but nevertheless to verify when a link is allocated to an area Zi whether that link is the only possible link for some other area Zj. If it is, the link must be allocated to area Zj and not to area Zi.

Accordingly, at time T, all the links set up at time T−1 for which allocation on the basis of similarity would be attempted are considered (step 1.1, FIG. 2).

To this end, the variables, which constitute new input data at time T and which enable links which cannot be retained to be detected among the links already allocated, are updated. Some of these lead to propagation of constraints (obligations to allocate certain links) (step 1.2, FIG. 2).

The algorithm for allocating optimized links as new links for demand not satisfied is then executed.

In a preferred embodiment, this algorithm comprises the following steps:

1—Links are allocated between a set of areas Zi on the ground and a set of N satellites, said links are determined by a channel, comprising the following steps, these steps being iterated for each channel k and for each satellite q:

an interference graph is constructed, said graph is used by a search algorithm associated with a constraints propagation algorithm for verifying capacities.

For this, all the areas visible from a satellite are considered. Of the areas Zi which were visible at time T−1, certain are no longer visible and are excluded.

2—The graph (see FIG. 4) is such that each node Nd corresponds to an area Zi ($Z_1$ to $Z_{Nz}$) such that the number of channels demanded (CD) is higher than the number of channels allocated (CA−CD and CA being input data for constructing the graph).

At any given time a satellite q covers Nz areas and has A beams Fi and NFp channels that can satisfy the demand in that area.

The traffic demand of an area, i.e. CD, the number of channels demanded, is known for an area. This number is deduced when a maximum acceptable interference threshold I has been fixed.

The number CA of channels allocated by the plan at time T−1 is also known.

The graph is updated by removing or adding an area as and when links are allocated.

For a satellite q and a given channel k, the search algorithm determines the greatest number of areas Zi toward which a beam Fi can be pointed by allocating the channel k to that beam.

To this end the following steps are executed:

3—The interference coefficient Ci,j is calculated for each pair of areas (Zi, Zj) of the graph for a channel k, k=1 to NFp (number of channels). This coefficient is calculated using a standard method. It consists in calculating the signal to noise ratio in the worst case scenario for the reception conditions, i.e. when transmitting at the same power level and in the same frequency band to all areas. A maximum acceptable interference threshold I can then be fixed.

4—The sum of the interference coefficients Ci,j for each area Zi is then compared to the fixed threshold I.

Thus for an area Zi the following calculation is effected: sum Ci,j and compare with I (i not equal to j).

5—A partition P is then created with at most A elements, A being the number of available beams and one of the beams pointing to each area of the partition. This enables a link to be defined for the areas of the partition:

take a candidate area Zi (i=1 to Np) from the partition P, verify that CD, the number of channels demanded for that area, is equal to NFmax, the maximum number of channels for that area, in which case include that area in the partition, complete the partition with the other candidate areas, i.e. the areas Zi for which the verification result is negative but for which the sum of the coefficients Ci,j does not exceed the threshold I.

6—The steps of constructing the graph (step 2) are reiterated up to iteration over all the areas of the partition (step 5) for another channel k (k=1 to NFp).

7—All the previous steps are reiterated for the N−1 other satellites.

Allocating a new link can lead to new constraints. If the demand of the area is satisfied when a new link is allocated, then the area must be removed from the partition for all the satellites (updating of the graph).

After iterating for all satellites and all resources (steps 6 and 7), the new allocation plan S(T) for time T is available.

What is claimed is:

1. A method of allocating links between a set of areas each equipped with at least one gateway and a set of satellites at successive times, the following steps being iterated each time:

detecting links which must be interrupted among all links allocated the previous time using a constraints propagation algorithm, and retaining the other links in a new allocation plan, using an optimization algorithm to allocate the remaining links, conforming to conditions imposed by interference problems.

2. The method of allocating links claimed in claim 1 wherein the constraints propagation algorithm used for detection comprises the following steps:

fixing at time T the allocated links of the previous allocation plan established at time T−1, eliminating the impossible links, defined by the known input variables for the new plan at time T, determining all remaining areas for which the demand is not satisfied.

3. The method claimed in claim 1 wherein said optimization algorithm for allocating links between all remaining areas Zi and all satellites N illuminating those areas, said links being determined by a channel, includes the following steps, which are iterated for each channel and for each satellite:

constructing an interference graph, use of said graph by a search algorithm associated with a constraints propagation algorithm to verify the capacities.

4. The method of allocating links claimed in claim 3 wherein the construction of said graph at a time during which a satellite covers a number of areas and has a number of beams and a number of channels includes the following steps:

constructing said graph for said satellite in which each node of said graph corresponds to an area such that the number of channels demanded for that area is greater than the number of channels allocated, updating said graph by removing or adding an area as and when links are allocated.

5. The method of allocating links claimed in claim 3 wherein the search algorithm uses the following steps:

calculating an interference coefficient for each pair of areas of the graph for a channel, comparing the sum of the interference coefficients for each area to a predetermined maximum acceptable interference threshold, creating a partition of at most the same number of elements as the number of beams which includes areas such that for each area the sum of the coefficients does not exceed the predetermined threshold.

6. The method of allocating links claimed in claim 3 wherein the iteration for each channel and for each satellite consists in reiterating all the steps of the method for another channel up to the last channel and then reiterating all of the preceding steps for another satellite up to the last satellite.

* * * * *